United States Patent [19]

Gallitzendörfer et al.

[11] 4,402,537
[45] Sep. 6, 1983

[54] BUMPER FOR MOTOR VEHICLES

[75] Inventors: Joseph Gallitzendörfer; Peter Pfeiffer; Johann Tomforde, all of Sindelfingen, Fed. Rep. of Germany

[73] Assignee: Daimler-Benz Aktiengesellschaft, Stuttgart, Fed. Rep. of Germany

[21] Appl. No.: 166,397

[22] Filed: Jul. 7, 1980

[30] Foreign Application Priority Data

Jul. 4, 1980 [DE] Fed. Rep. of Germany ....... 2927036

[51] Int. Cl.³ .............................................. B60R 19/00
[52] U.S. Cl. .................................... 293/149; 296/191
[58] Field of Search ............... 296/188, 189, 191, 194, 296/198, 15; 293/149, 150, 151, 152, 120

[56] References Cited

U.S. PATENT DOCUMENTS

| 2,954,256 | 9/1960 | Barneyi | 293/152 |
| 3,565,481 | 2/1971 | Wessells | 296/191 |
| 3,924,888 | 12/1975 | Butcher | 293/149 |
| 4,142,753 | 3/1979 | Klie | 293/120 |
| 4,153,290 | 5/1979 | Barneyi | 296/191 |
| 4,251,096 | 2/1981 | Stock | 293/150 |
| 4,291,911 | 9/1981 | Gallmeyer | 296/15 |

Primary Examiner—David M. Mitchell
Assistant Examiner—John A. Carroll
Attorney, Agent, or Firm—Craig & Burns

[57] ABSTRACT

A vehicle bumper which includes a shaped member supporting part that is open toward the front and is braced on fixed vehicle parts. The supporting part exchangeably accepts at least one energy-absorption member and includes at least one skirt that extends downwardly. The shaped member supporting part and at least a middle zone of the skirt are made in one piece and are formed of a filament-reinforced plastic. A filament content of the shaped supporting part is increased by a predetermined multiple with respect to a filament content of the skirt.

11 Claims, 9 Drawing Figures

BUMPER FOR MOTOR VEHICLES

The present invention relates to an automobile bumper and, more particularly, to an automobile bumper provided with a shaped member supporting part which is open toward the front and braces on fixed vehicle parts and which enables an exchangeable accommodation of at least one energy-absorption member, and which includes at least one covering that extends downwardly in a skirt-like manner.

In German Gebrauchsmuster 78 31 722, a bumper arrangement is proposed wherein a skirt, consisting of a specially yielding supporting material, is braced on a shaped member supporting part. A disadvantage of this proposed construction resides in the fact that the shaped member supporting part and the skirt make a relatively heavy structural part. Moreover, when the automobile is driven in a rather high speed range, there is a danger that the skirt will be deformed by air stresses that occur so that the desired effect obtainable by the use of the skirt will almost be eliminated.

The aim underlying the present invention essentially resides in providing a bumper for an automobile which retains the advantages afforded by exchangeable energy-absorption members but which has a distinctly reduced weight nevertheless enabling the bumper to reliably take up induced forces, and wherein a skirt associated with the bumper is of such construction that forces acting on the skirt can have no negative effect on the form of the covering of the bumper.

In accordance with advantageous features of the present invention, an automobile bumper of the aforementioned type is proposed wherein a shaped member supporting part and at least a middle zone of a skirt are made of one piece and are formed of a filament reinforced plastic, with the amount of filament in the shaped member supporting part being increased by a multiple with respect to the amount of filament in the skirt.

By virtue of the above-noted features of the present invention, an arrangement is provided which is simple in construction, but yet combines the advantages of low weight with adequate strength and, depending upon the specific field of application, by the use of oriented or unoriented glass or carbon filaments, it is possible to yet cover another strength range.

Preferably, in accordance with the present invention, an inner notch is provided in a transition zone of the shaped member supporting part and the skirt. By virtue of this feature, if the skirt strikes an obstacle whereby the force that occurs is greater than the force of the air occurring in driving, a deflection will occur which is extensively or largely reversible.

Advantageously, in accordance with the present invention, two exchangeable lateral parts are joined in a middle zone of the skirt and are connected with the middle portion of the skirt and possibly with a shaped member supporting part and/or a part of the body of the automobile by a fastening arrangement such as, for example, clamps, screws, or a clip connection.

The two exchangeable lateral parts joined in the middle zone of the skirt may be formed of a sheet material or a plastic material, and such material may be the same or different from the material of the middle zone of the skirt.

In accordance with further advantageous features of the present invention, the exchangeable energy-absorption members are formed of a foamed material and impact surfaces of the absorption members are covered by a tough elastic skin, which presents bent-down flanges at ends thereof running more or less transverse to the vehicle. The flanges are adapted to respectively engage, with a pretensioning, a respective profile section of a support that bears on the shaped member supporting part.

It is also possible in accordance with the present invention to provide supplementary energy-absorption members in the form of regeneratable impact dampers through which the support is braced on the shaped member supporting part.

Accordingly, it is an object of the present invention to provide an automobile bumper which avoids, by simple means, shortcomings and disadvantages encountered in the prior art.

Another object of the present invention resides in providing an automobile bumper which is of light weight, but yet reliably takes up forces impacted thereon.

Another object of the present invention resides in providing an automobile bumper which enables the use of exchangeable energy-absorption members.

A further object of the present invention resides in providing an automobile bumper including a skirt mounted thereon for springing deflection upon impact with a solid obstacle.

A still further object of the present invention resides in providing an automobile bumper which is simple in construction and therefore relatively inexpensive to manufacture.

These and other objects, features, and advantages of the present invention will become more apparent from the following description when taken in connection with the accompanying drawing which shows, for purposes of illustration only, several embodiments in accordance with the present invention, and wherein.

Figure 1:
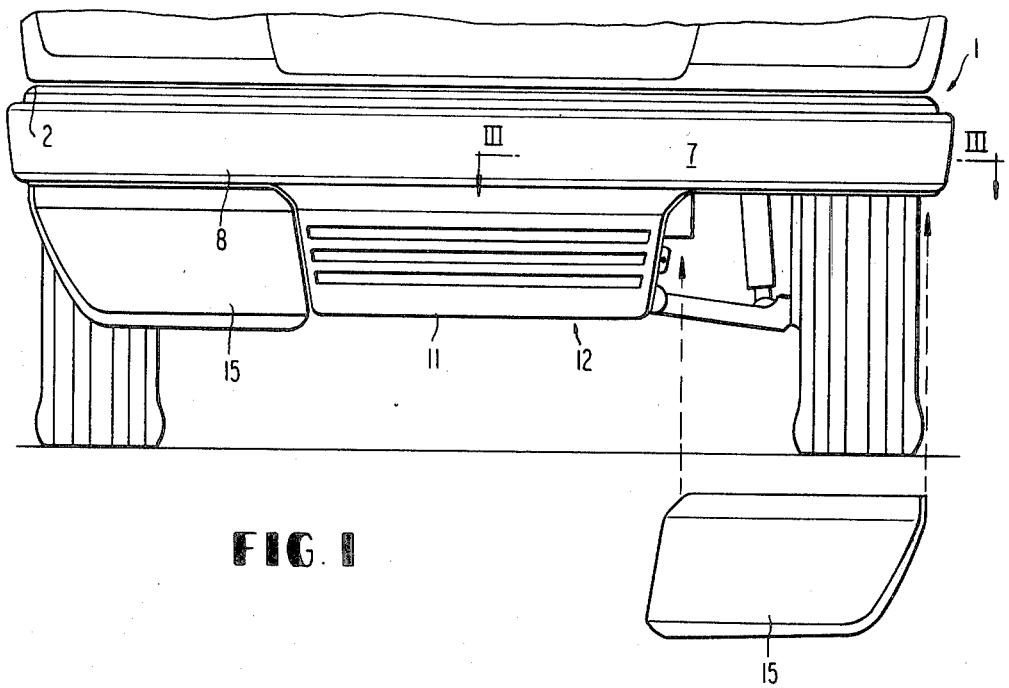
FIG. 1 is a partial front view of a motor vehicle having a bumper mounted thereon in accordance with the present invention.
Figure 4:
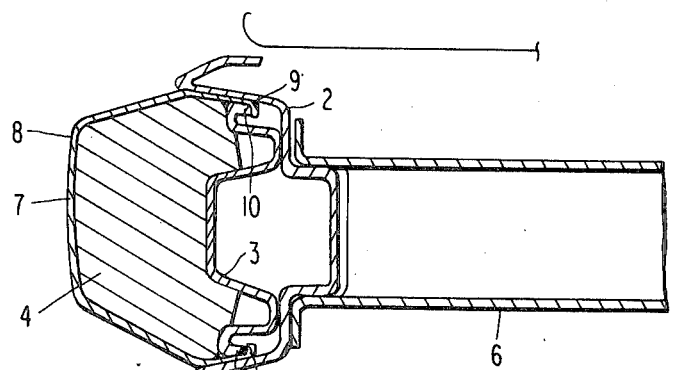
FIG. 4 is a cross-sectional view of another bumper arrangement in accordance with the present invention.

Referring now to the drawing wherein like reference numerals are used throughout the various views to designate like parts and, more particularly, to FIGS. 1 and 4, according to this figure, a bumper generally designated by the reference numeral 1 includes a shaped supporting part 2 that is open toward the front in order to receive a support member 3 as well as exchangeable energy-absorption members 4, 5. The shaped member supporting part 2 bears on fixed vehicle parts 6. A tough elastic skin 7 covers an impact surface 8 of the energy-absorption members 4.

Figure 5:
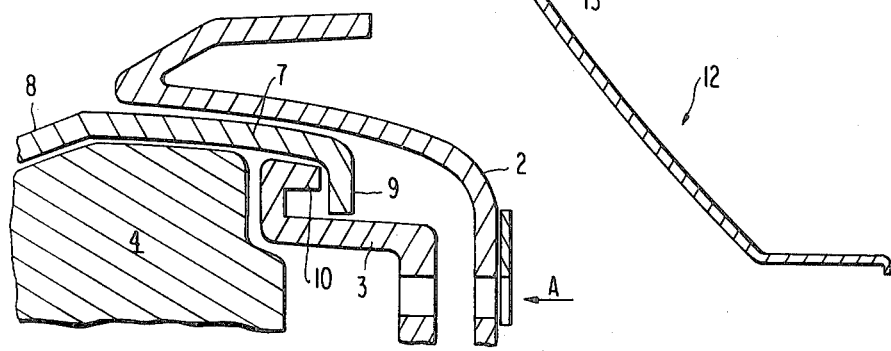
FIG. 5 is an enlarged cross-sectional view of an upper fastening arrangement for the bumper of FIG. 4.

As shown most clearly in FIG. 4, flanges 9, extending somewhat transverse to the longitudinal axis of the vehicle are provided at the ends of the energy-absorption members, with the flanges being adapted to engage associated shaped sections 10 of the support 3. To fix the bumper assembly to the fixed vehicle part 6, as shown most clearly in FIG. 5, a fastening element of the support 3 extending in a direction of the arrow A is drawn toward the shaped member supporting part 2, and the tough elastic skin 7 is applied to the shaped member supporting part 2.

As shown in FIGS. 1, 2, 4, and 6, the shaped member supporting part 2 runs out, in a middle zone 11, into a covering made as a skirt generally designated by the reference numeral 12. The shaped member supporting part 2 and the skirt 12 consist essentially of a filament-reinforced plastic material with an amount of filaments in the shaped member supporting part 2 being increased by a multiple of the amount of filaments in the skirt 12.

With the use of glass filaments, the amount of glass filaments in the shaped member supporting part 2 may, for example, be 40 to 60% and in the skirt 12 may, for example, be 5 to 20%. In order to have a springing deflection of the skirt 12 if it strikes a solid obstacle or object, in a transition zone between the skirt 12 and the shaped member supporting part 2, the material is weakened by, for example, providing a notch 13 (FIG. 4).

Figure 6:
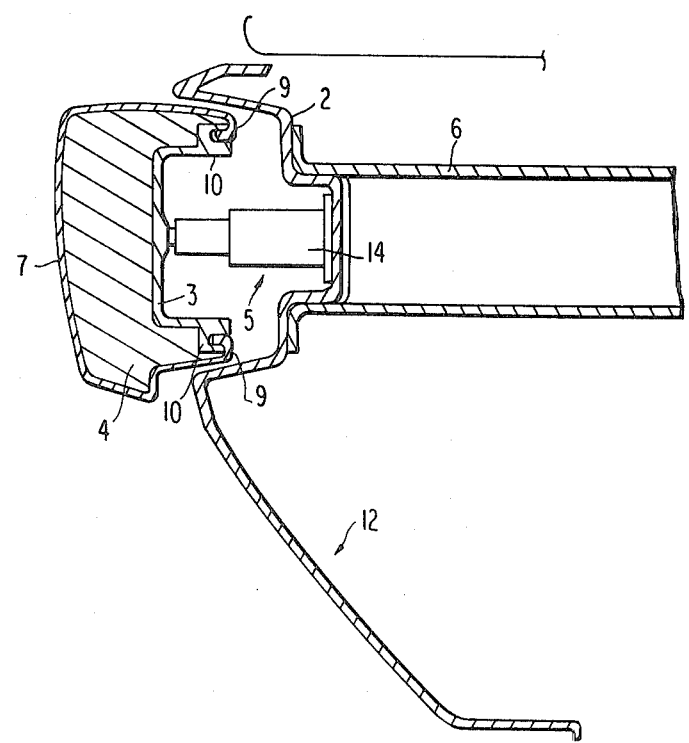
FIG. 6 is a cross-sectional view of a still further bumper arrangement in accordance with the present invention.

As shown most clearly in FIG. 6, in addition to energy-absorption members 4 that are formed from a regeneratable foamed material, it is also possible in accordance with the present invention, to utilize other energy-absorption members such as, for example, impact damping devices 14 which are braced or supported on the shaped member supporting part 2. To enable the achievement of a firm holding of the tough skin 7, the flanges 9 of the skin are adapted to engage below the shaped sections 10 formed on the support 3 with a pretensioning.

Figure 3:
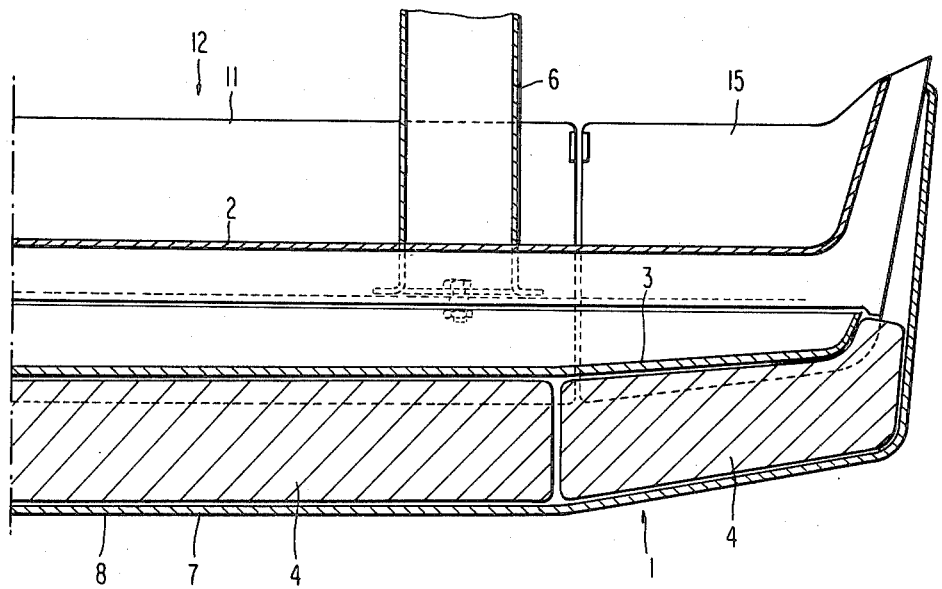
FIG. 3 is a cross-sectional view taken along line III—III of FIG. 1.
Figure 2:
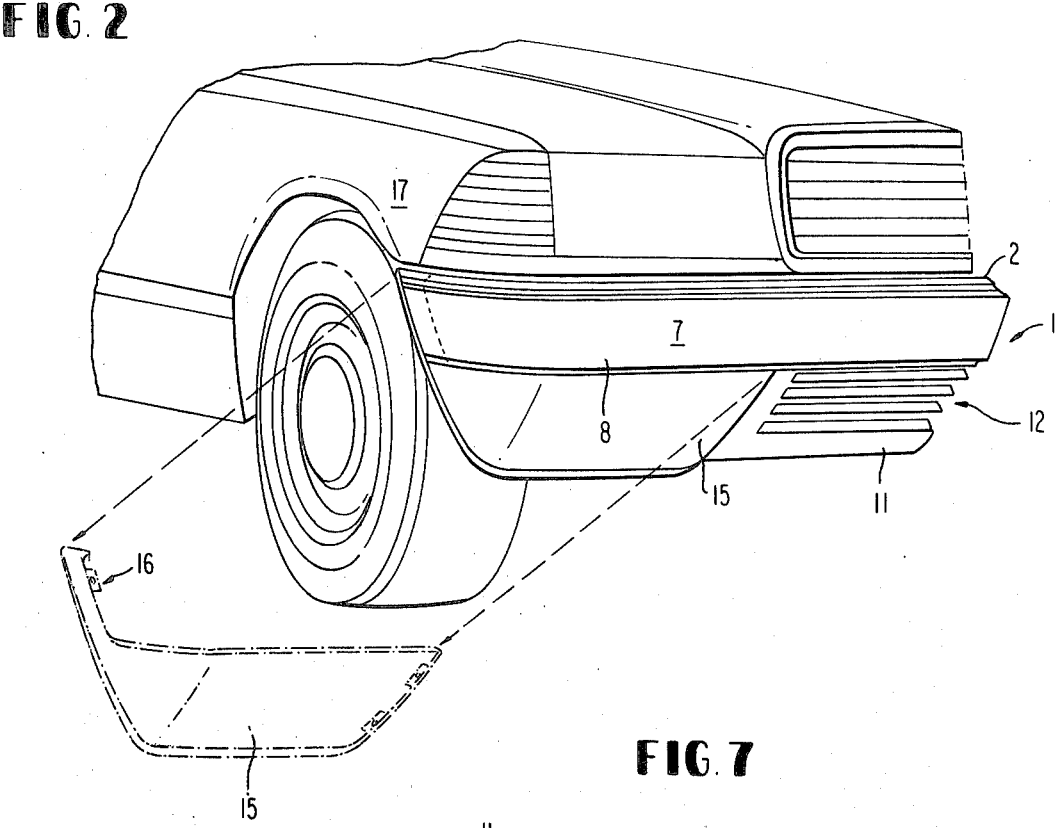
FIG. 2 is an enlarged view of a corner zone of the bumper of FIG. 1 provided with a lateral guard, with a mud guard or wheel running section.

As shown in FIGS. 1-3, lateral parts 15 are disposed adjacent the middle zone 11 of the skirt 12 on respective sides thereof. The lateral parts 12 may be connected with the middle zone 11 and posssibly with the shaped member supporting part 2. If, as shown in FIG. 2, the lateral part 15 is provided with a mud guard or shield section 16, such section may be supplementarily connected with a part 17 of the vehicle body.

Figure 7:
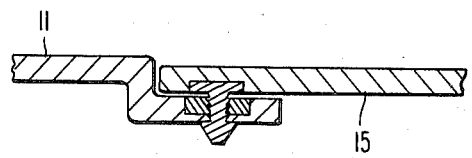
FIGS. 7-9 are partial cross-sectional views of various fastening arrangements for lateral parts to a middle zone of a skirt of the bumper of the present invention.
Figure 8:
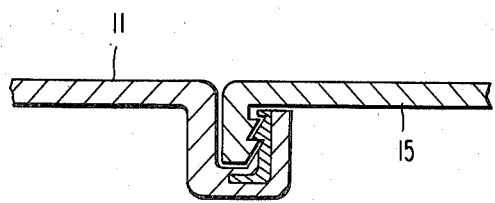
Figure 9:
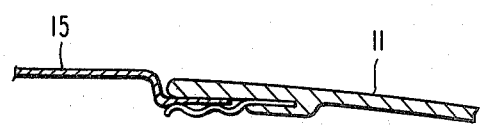

As shown in FIG. 7, the lateral parts 15 may be connected to the middle zone 11 of the skirt 12 by, for example a suitable threaded fastener. It is also possible, as shown in FIG. 8, to provide the lateral part 15 with a bent portion terminating in serrations adapted to match with corresponding serrations provided on a member disposed in a U-shaped end portion of the middle zone 11 of the skirt 12. As shown in FIG. 9, the lateral parts 15 may be provided with an offset portion adapted to be receive between a resilient means such as, for example, a spring finger or the like anchored in the middle zone 11 of the skirt 12. As can be appreciated, the various types of connections between the middle zone 11 and the lateral parts 15 such as illustrated in FIGS. 7-9 enable the fastening and anchoring parts to be laminated into the respective members.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. A vehicle bumper comprising
a shaped member supporting means, the supporting means being open in a forward direction of the vehicle and being adapted to be supported on fixed parts of the vehicle for absorbing energy,
at least one energy-absorption means exchangeably mounted in the supporting means, a skirt portion extending downwardly from the bumper, characterized in that
the supporting means and at least a center area of the skirt are formed in one piece,
the supporting means and the skirt are formed of a filament reinforced plastic material, and
means are provided in an area of transition between the supporting means and the skirt for enabling a deflection of the skirt about an axis which is substantially horizontal and substantially transverse to the direction of vehicular travel.

2. A vehicle bumper according to claim 1, characterized in that the means for enabling a deflection is a notch forming a weakening area between the supporting means and the skirt.

3. A vehicle bumper according to claim 1, characterized in that at least one lateral part adjoins each side of the center area of the skirt, and in that means are provided for connecting each lateral part to one of a body portion of the vehicle or a supporting part of the bumper.

4. A vehicle bumper according to claim 3, characterized in that said connecting means includes one of a clamp, a screw, or a clip.

5. A vehicle bumper according to claim 3, characterized in that the lateral parts are formed of a sheet metal material.

6. A vehicle bumper according to claim 3, characterized in that the lateral parts are formed of the same plastic material as the center area of the skirt.

7. A vehicle bumper according to claim 3, characterized in that the lateral parts are formed of a plastic material which is different from the plastic material of the center area of the skirt.

8. A vehicle bumper according to one of claims 1, 2, 3, 4, or 5, characterized in that the energy absorption means are formed of a foamed material, and in that an impact surface of the energy-absorption means is covered by a tough elastic cover.

9. A vehicle bumper according to claim 8, characterized in that the supporting means includes a profile section adapted to bear against a supporting part of the bumper with a predetermined pretensioning, and in that the elastic cover includes at least one flange portion extending transversely of the vehicle, said flange portion is adapted to engage said profile section.

10. A vehicle bumper according to one of claims 1, 2, 3, 4, or 5, characterized in that the energy-absorption means are formed as a regeneratable impact damper means for mounting a support of the bumper on the supporting means.

11. A vehicle bumper as set forth in claim 1, wherein a filament content of said plastic material of said skirt is a predetermined multiple of a filamemt content of said supporting means.

* * * * *